United States Patent
Kawachi

(10) Patent No.: US 7,423,559 B2
(45) Date of Patent: *Sep. 9, 2008

(54) REPRODUCTION APPARATUS

(75) Inventor: Shuhei Kawachi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/435,864

(22) Filed: May 18, 2006

(65) Prior Publication Data

US 2006/0202871 A1 Sep. 14, 2006

Related U.S. Application Data

(62) Division of application No. 11/165,510, filed on Jun. 24, 2005, now Pat. No. 7,113,113.

(30) Foreign Application Priority Data

Jun. 25, 2004 (JP) ............................. 2004-188249

(51) Int. Cl.
*H03M 7/34* (2006.01)
(52) U.S. Cl. ......................................... 341/51; 341/50
(58) Field of Classification Search .................. 341/51, 341/50, 67
See application file for complete search history.

(56) References Cited

U.S. PATENT DOCUMENTS 6,111,528 A 8/2000 Bagley ........................ 341/58
7,113,113 B2 * 9/2006 Kawachi ..................... 341/51
7,180,901 B2 * 2/2007 Chang et al. ........... 370/395.64

FOREIGN PATENT DOCUMENTS

JP 2001-202094 7/2001

* cited by examiner

*Primary Examiner*—Rexford Barnie
*Assistant Examiner*—Joseph Lauture
(74) *Attorney, Agent, or Firm*—Fitzpatrick, Cella, Harper & Scinto

(57) ABSTRACT

A reproduction apparatus includes a reproduction unit that reproduces plurality of information data encoded using mutually different encoding systems from a recording medium, a program storage unit that stores multiple kinds of decoding programs corresponding to the different encoding systems, a program loading memory into which a part of the plurality of kinds of decoding programs can be loaded; a decoding unit that decodes the reproduced information data using a decoding program loaded into the program loading memory, an instruction unit that instructs start of reproduction of the information data, and a control unit that selects a decoding program to be loaded into the program loading memory from among the multiple kinds of decoding programs stored in the program storage means in accordance with a predetermined rule, reads out the selected decoding program from the program storage means, and loads the read-out decoding program into the program loading memory, before the starts of reproduction is instructed by the instruction unit.

11 Claims, 12 Drawing Sheets

REPRODUCTION APPARATUS

RELATED APPLICATION

This application is a divisional of application Ser. No. 11/165,510, filed Jun. 24, 2005, the entire contents of which are incorporated herein by reference.

BACKGROUND OF THE INVENTION

1. Field of the Invention

The present invention relates to a reproduction apparatus, in particular, processing for reproducing information data encoded using multiple different encoding systems.

2. Related Background Art

In recent years, more and more devices having a function of recording and reproducing moving images and audio onto and from a memory card have become available.

For instance, although digital cameras formerly had only a function of recording and reproducing still images, many digital cameras also having a function of recording and reproducing moving images and audio have currently been loaded.

Also, in the field of video cameras, apparatuses having a function of recording and reproducing moving image data onto and from not only a tape medium but also a disk medium, such as a memory card, an optical disk, or a hard disk (HDD), have come into being. Further, video cameras that record and reproduce image data and audio data onto and from a memory card or a disk medium instead of a tape medium have also come into being.

Ordinarily, when digital video image/audio data is recorded into a memory card or a disk medium in this manner, a data amount reduction is achieved through encoding of the data to be recorded.

Commonly used moving-image compression encoding system standards include standards stipulated by Moving Picture Experts Group (MPEG), such as MPEG2 and MPEG4, each of which also defines an audio-data encoding system. Also, there are various audio-data compression systems such as G.726, Advanced Multi Rate CODEC (AMR), and Advanced Audio Coding (AAC) recommended by International Telecommunications Union (ITU).

Generally, irreversible compression is performed in those compression systems and it is possible to achieve a data amount reduction through encoding processing, but the image quality and audio quality of encoded data are deteriorated from those of original data.

Also, generally, as data is compressed at a higher compression ratio, the image quality and audio quality of encoded data are lowered. However, the degree of the lowering of the image quality and audio quality also greatly depends on the performance of a compression algorithm itself and compression encoding systems with less degradation are currently under loadment and standardization.

As described above, currently, multiple kinds of encoding systems are widely used, so a situation is conceivable in which moving image data and audio data compression-encoded and recorded using multiple kinds of encoding systems are coexistently recorded in one memory card or disk medium.

Therefore, it is desired that it is possible to reproduce data compressed using various kinds of encoding systems with one reproduction apparatus.

The amount of computation in decoding processing performed at the time of reproduction of compressed moving image data is large, so a dedicated hardware is used in many cases expect for an environment, such as a personal computer, in which there exist sufficient resources such as a CPU and a memory.

On the other hand, the processing amount of expansion and decoding processing of compressed audio data is smaller than that of moving image data, so in the case of a built-in device whose hardware resources are limited, the processing is achieved by software in many cases. When the processing is achieved by software, a compression program and an expansion program are collectively referred to as a "codec" (COder DECoder).

In Japanese Patent Application Laid-open No. 2001-202094, a reproduction apparatus is proposed which reproduces audio data encoded using multiple compression encoding systems, where a codec is loaded into a work RAM from a codec storing memory or an external device on a network in accordance with the encoding system of a file to be reproduced and then is executed.

According to Japanese Patent Application Laid-open No. 2001-202094, it becomes possible to reproduce even a reproduction target encoded using an encoding system, which requires a decoding program that is not stored in an internal memory of the apparatus, by loading the decoding program from the outside.

When doing so, in Japanese Patent Application Laid-open No. 2001-202094, after audio data that should be reproduced is designated, a codec program corresponding to the encoding system of the audio data is loaded into the RAM.

However, a long time is taken to load a decoding program into the RAM, which leads to a problem that it is impossible to start reproduction promptly after issuance of a reproduction-start instruction by a user.

Also, generally, a built-in device is greatly limited in hardware resources and it is impossible to concurrently load multiple decoding programs into a RAM in many cases. In such a case, there arises a necessity to load decoding programs stored in a flash ROM into the RAM, which leads to a problem that it is impossible to start reproduction before the loading of the decoding programs into the RAM is completed.

SUMMARY OF THE INVENTION

An object of the present invention is to solve the problems described above.

Another object of the present invention is to provide a reproduction apparatus that is capable of starting reproduction swiftly even when information data compression-encoded using multiple kinds of compression encoding systems is expanded by using multiple kinds of decoding programs.

The present invention has been made to solve the above-described problems and achieve the objects. According to one aspect of the present invention, a reproduction apparatus including: reproduction means for reproducing a plurality of information data encoded using mutually different encoding systems from a recording medium; program storage means for storing a plurality of kinds of decoding programs corresponding to the different encoding systems; a program loading memory in which a part of the plurality of kinds of decoding programs can be loaded; decode means for decoding information data reproduced by the reproduction means using a decoding program loaded into the program loading memory; instruction means for instructing start of reproduction of information data; and control means for, before reproduction start is instructed by the instruction means, selecting a decoding program that to be loaded into the program loading memory from among the plurality of kinds of decoding programs stored in the program storage means in accordance with a predetermined rule, reading out the selected decoding program from the program storage means, and loading the read-out decoding program into the program loading memory.

Other objects and features of the present invention will become apparent from the following detailed description of embodiments of the present invention to be made with reference to the accompanying drawings.

DESCRIPTION OF THE PREFERRED EMBODIMENTS

Hereinafter, embodiments of the present invention will be described.

As a first embodiment, a case will be described in which the present invention is applied to a reproduction apparatus that reproduces audio data recorded in a memory card.

Figure 1:
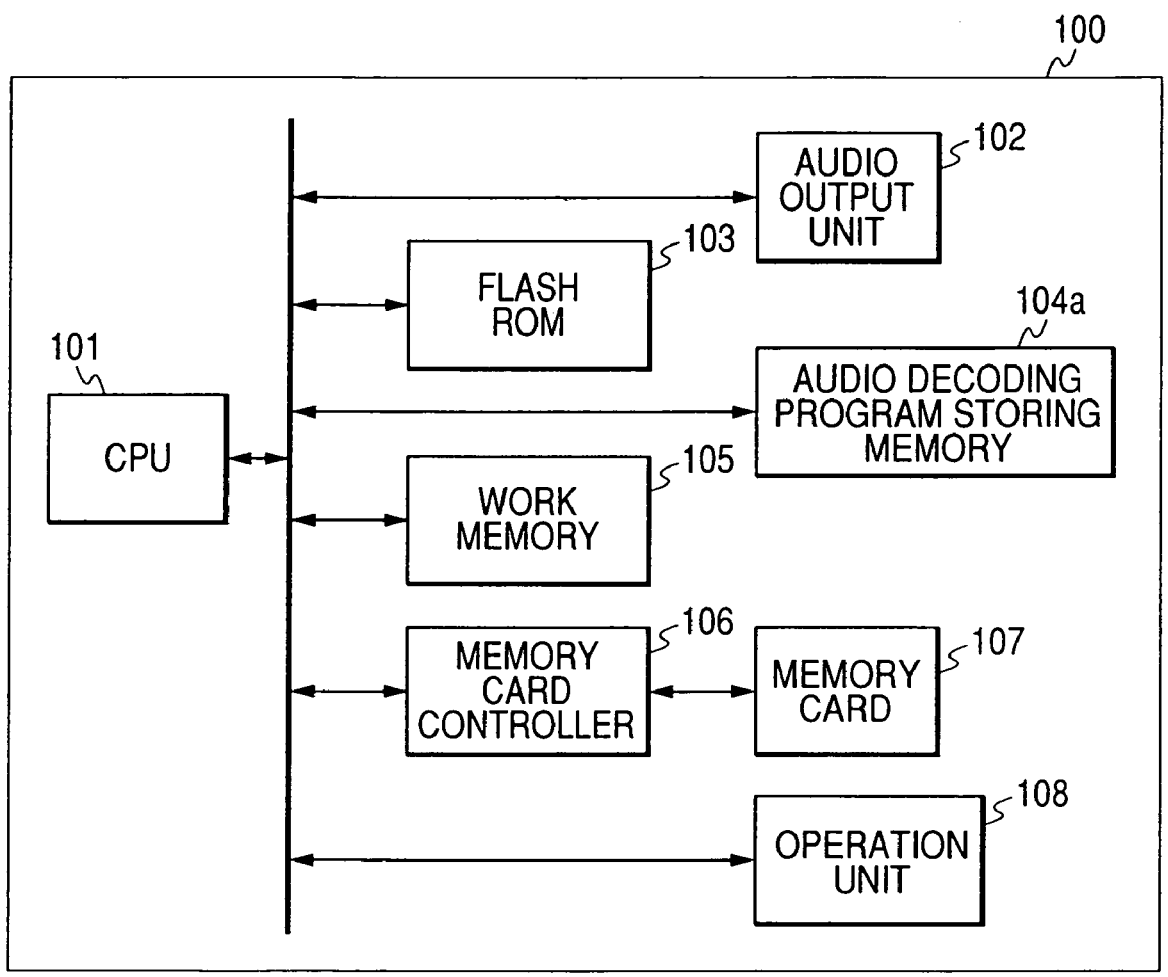
FIG. 1 is a construction diagram of a reproduction apparatus in a first embodiment.

FIG. 1 shows a construction of a reproduction apparatus 100.

The reproduction apparatus 100 includes a central processing unit (CPU) 101, an audio output unit 102, a flash ROM 103, an audio decoding program storing memory 104a, a work memory 105, a memory card controller 106, and an operation unit 108. Also, it is possible to attach and detach a memory card 107 to and from the reproduction apparatus 100 with ease by using a not-shown attaching and detaching mechanism.

Instructions such as reproduction and stop instructions are issued by a user using the operation unit 108 and are sent to the CPU 101. In addition, displaying for prompting the user to select a reproduction target and the like is also performed through the operation unit 108. On the memory card 107, audio data compression-encoded using various kinds of encoding systems are recorded. On receiving instructions from the CPU 101, the memory card controller 106 performs reading and writing of data onto the memory card 107. The flash ROM 103 stores decoding programs corresponding to the multiple kinds of encoding systems. The audio decoding program storing memory 104a stores a decoding program read from the flash ROM 103.

It should be noted here that in this embodiment, the flash ROM 103 uses a memory which is inexpensive and has a large capacity but whose data reading-out speed is relatively slow, and the audio decoding program storing memory 104a is a memory that is capable of reading and writing data at high speed.

In order to reproduce data recorded on the memory card 107, it is required to read a decoding program corresponding to the encoding system of audio data to be reproduced from the flash ROM 103 and load it into the audio decoding program storing memory 104a. The work memory 105 is a work area that temporarily stores data at the time of decoding of audio data.

The CPU 101 is constructed from a microcomputer, its associated register, and the like. In this embodiment, although audio data decoding processing is performed by the CPU 101 using a decoding computer program loaded into the memory 104a, the processing may be achieved by a Digital Signal Processor (DSP). When the decoding processing is performed by the DSP, the audio decoding program storing memory 104a corresponds to an instruction memory and the work memory 105 corresponds to a data memory. Note that the audio decoding program storing memory 104a uses a relatively expensive memory and its capacity is limited for the sake of cost reduction, so it is impossible to concurrently store every decoding program stored in the flash ROM 103 into the audio decoding program storing memory 104a.

Figure 2:
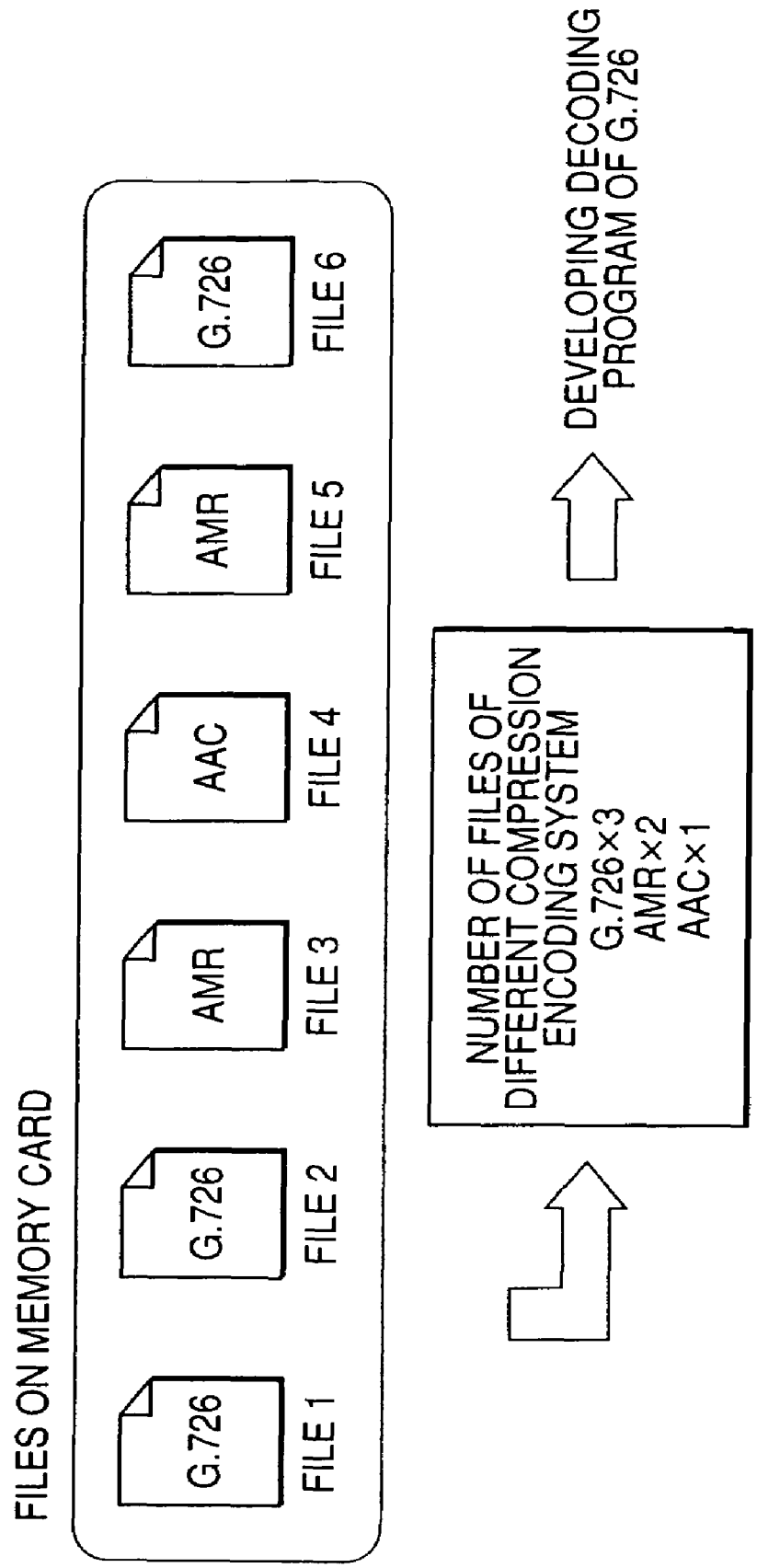
FIG. 2 shows a relation between reproduction data in a memory card and a decoding program loadment method in the first embodiment.

FIG. 2 shows a state of audio data recorded in the memory card 107. On the memory card 107, multiple pieces of audio data encoded using different encoding systems are recorded.

Figure 10:
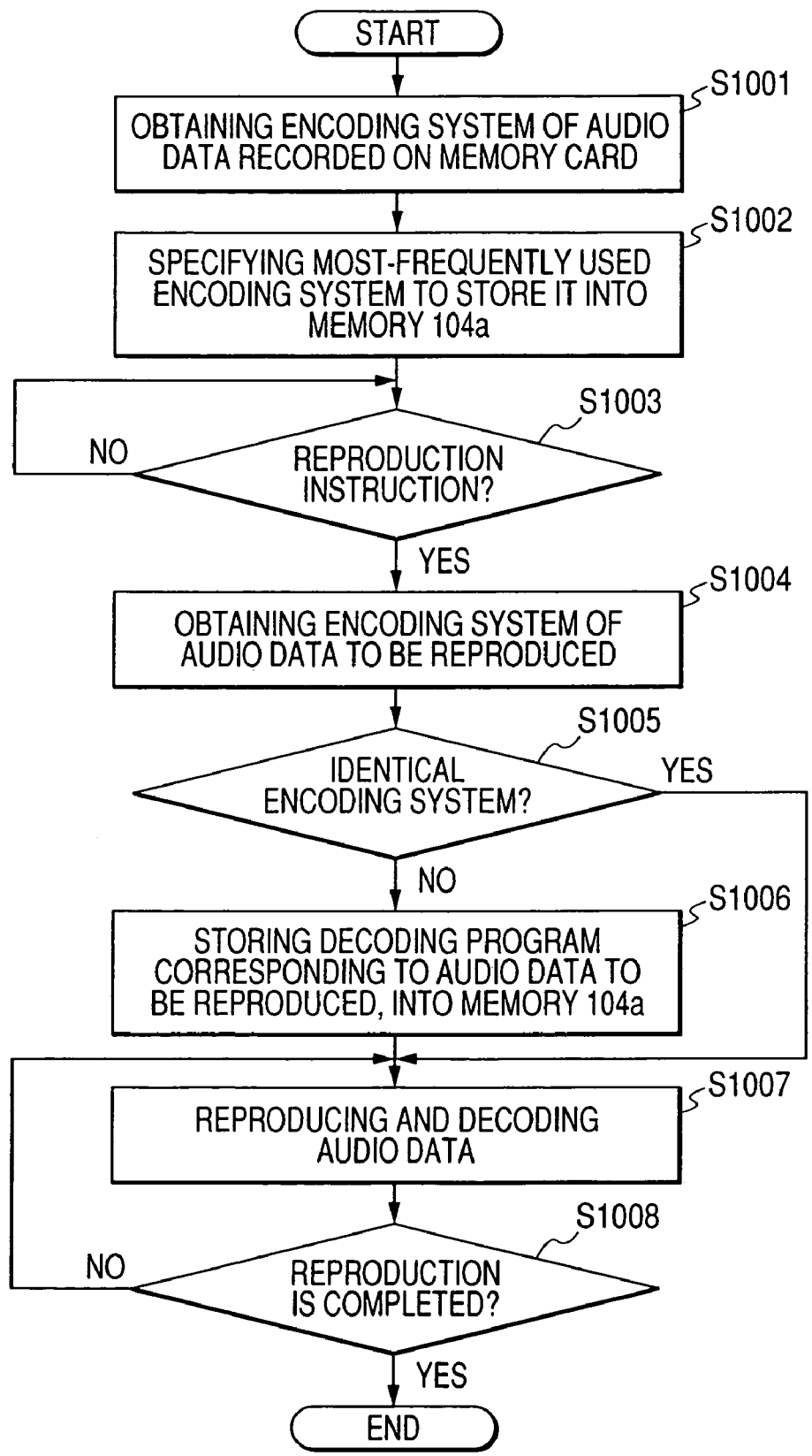
FIG. 10 is a flowchart showing reproduction processing in the first embodiment.

Next, processing at the time of audio data reproduction from the memory card 107, on which audio data has been recorded in the manner described above, will be described. FIG. 10 is a flowchart showing reproduction processing in this embodiment.

The flow in FIG. 10 is started in response to power-up or attaching of a new memory card 107.

First, after the power-up or the attaching of the new memory card 107 and before start of reproduction is instructed through the operation unit 108, the CPU 101 instructs the memory card controller 106 to access the memory card 107 and checks the encoding systems of audio data recorded on the memory card 107 (Step S1001).

Then, the CPU 101 specifies an encoding system, which is most frequently used to encode the files on the memory card 107, by using a result of the check, reads out an audio decoding program corresponding to the encoding system from the flash ROM 103, and stores it into the audio decoding program storing memory 104a (Step S1002).

In an example shown in FIG. 2, the number of audio data encoded using the G.726 system is the maximum, so a decoding program of G.726 is stored into the audio decoding program storing memory 104a.

Following this, when the user instructs to start reproduction by operating the operation unit 108 (Step S1003), it is judged whether the encoding system of data to be reproduced is the same as the encoding system corresponding to the decoding program stored in the audio decoding program storing memory 104a (Step S1005).

When the encoding system of the audio data to be reproduced is different from the encoding system corresponding to the decoding program stored in the memory 104a, the CPU 101 reads out a decoding program corresponding to the encoding system of the audio data to be reproduced from the flash ROM 103 and stores it into the audio decoding program storing memory 104a (Step S1006). Then, the audio data is reproduced from the memory card 107 and is decoded using the decoding program stored in the memory 104a (Step S1007). The decoded audio data is outputted to a speaker, a headphone, or the like outside the apparatus through the audio output unit 102.

On the other hand, when the encoding system of the audio data to be reproduced is the same as the encoding system corresponding to the decoding program stored in the memory 104a, the CPU 101 readily reproduces the audio data to be reproduced from the memory card 107 and decodes the reproduced audio data using the decoding program stored in the memory 104a.

Following this, when it is instructed to stop the reproduction or the audio data to be reproduced has been reproduced to the end thereof, the processing is ended (Step S1008).

Next, an operation of the operation unit 108 at the time when the user instructs to start reproduction will be described.

Figure 3:
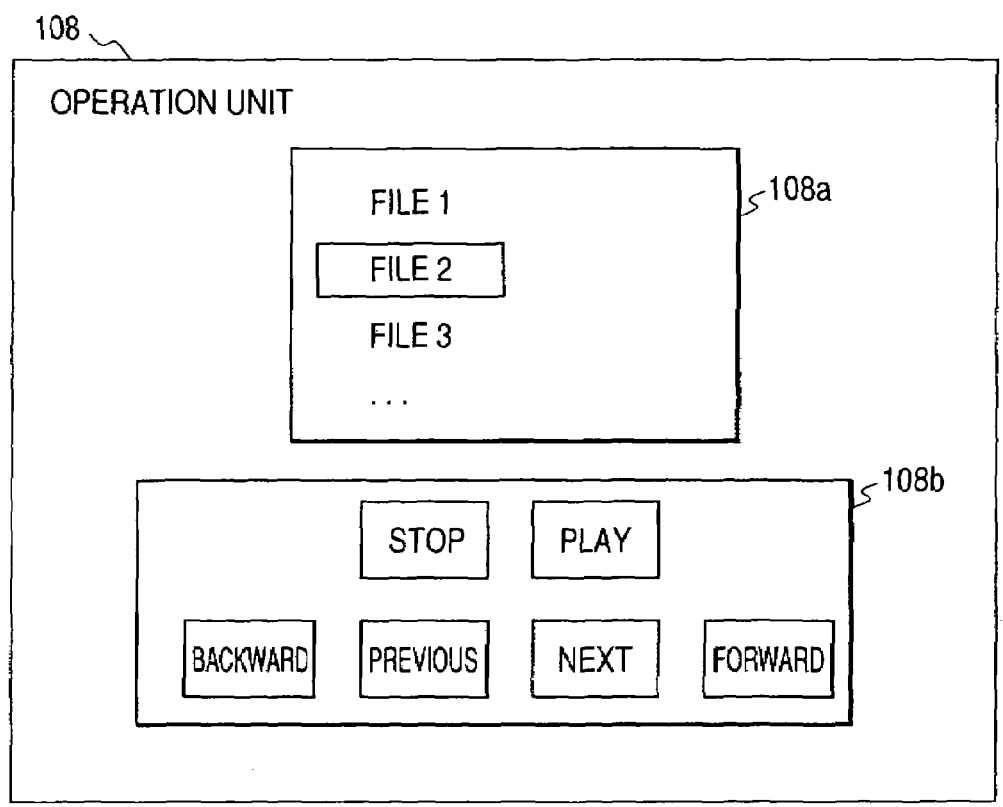
FIG. 3 is a conceptual diagram showing a construction of an operation unit in the first embodiment.

FIG. 3 is an explanatory diagram of the operation unit 108. The operation unit 108 includes an audio data list display area 108a and an operation instruction area 108b. In the audio data list display area 108a, a list of audio data recorded on the memory card 107 and a selection state of data to be reproduced are displayed. The operation instruction area 108b includes operation buttons for instructing various operations such as selection of data to be reproduced, start/stop of reproduction, and forwarding/backwarding, and the user issues instructions to the reproduction apparatus 100 by operating the buttons.

Figure 4:
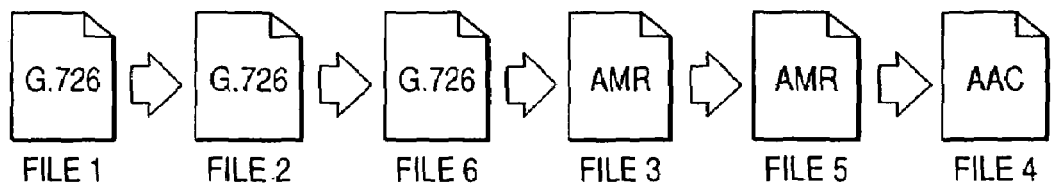
FIG. 4 shows an example of a reproduction order of data in the first embodiment.

When the reproduction apparatus 100 enters into a state in which it is possible to instruct reproduction, the CPU 101 determines the display order of reproduction data in a list to be displayed for the user with reference to their encoding systems and displays the reproduction data in order in the audio data list display area 108a so that files encoded using the most frequently used encoding system are displayed first. In the case of the example shown in FIG. 2, the display order is determined as shown in FIG. 4. With this construction, a probability that the encoding system of reproduction data selected by the user and the encoding system corresponding to a decoding program loaded in the audio decoding program storing memory 104a in advance will agree with each other is increased and also files using the same encoding system are reproduced in succession, so it becomes possible to reduce the number of operations for reading decoding programs into the audio decoding program storing memory 104a. As a result, it becomes possible to reduce a waiting time due to reading of decoding program at the time of reproduction.

As described above, in this embodiment, a decoding program corresponding to an encoding system most frequently used to encode files recoded on the memory card 107 is stored into the audio decoding program storing memory 104a before it is instructed to start reproduction of audio data. Therefore, it becomes possible to decrease a probability that it will be required to load a decoding program from the flash ROM 103 at the time of the start of the reproduction. As a result, it becomes possible to start the reproduction swiftly after it is instructed to start the reproduction.

Next, a second embodiment will be described.

In the first embodiment, a case has been described in which the present invention is applied to an apparatus that reproduces audio data. In this embodiment, however, a case will be described in which the present invention is applied to a reproduction apparatus that reproduces moving image data containing audio.

Figure 5:
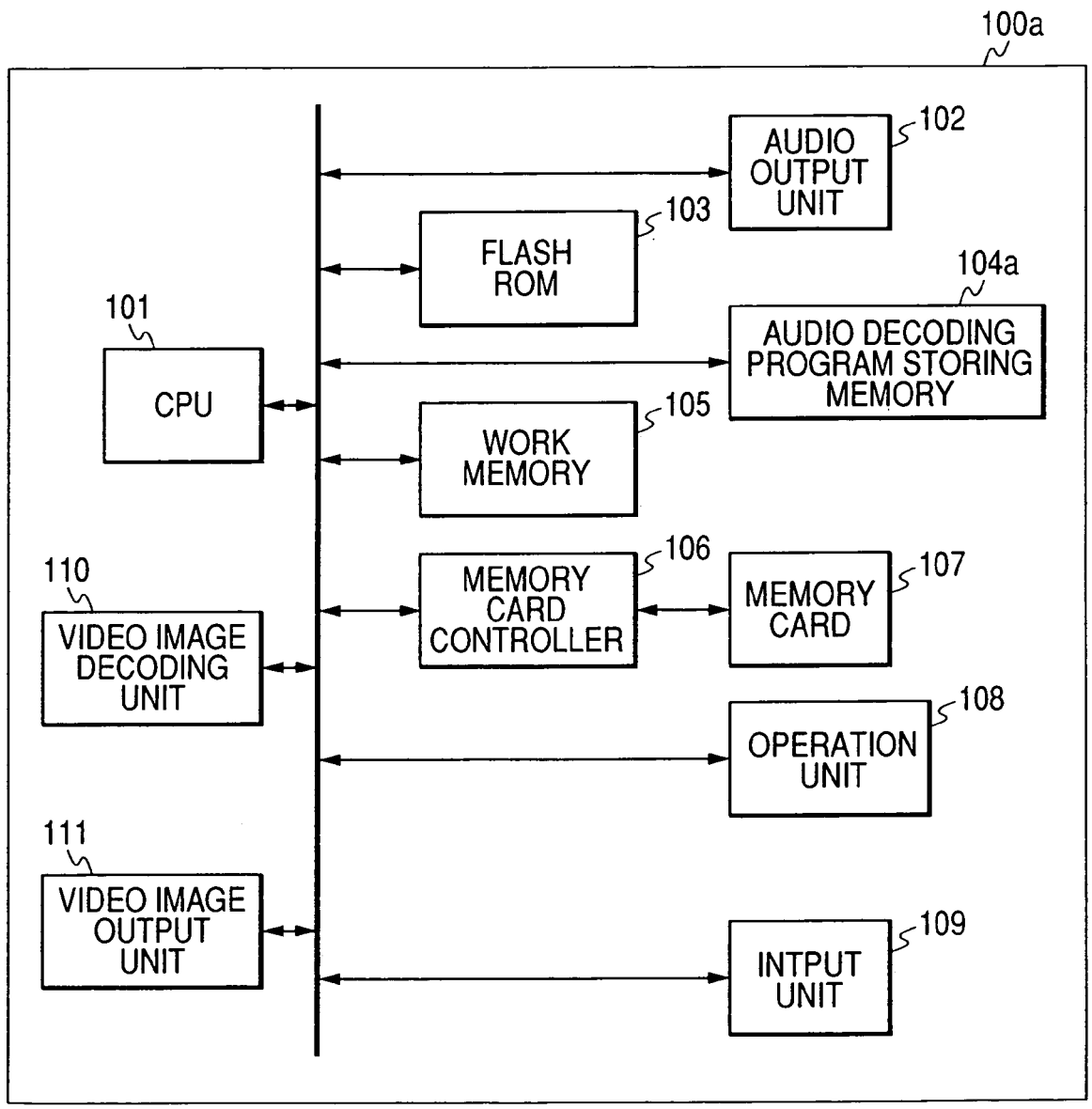
FIG. 5 is a construction diagram of reproduction apparatuses in second, third, and fifth embodiments.

FIG. 5 shows a construction of a reproduction apparatus 100a in this embodiment.

Each construction of the reproduction apparatus 100a that is the same as a construction shown in FIG. 1 is given the same reference symbol and only each portion thereof that is different from portions of the reproduction apparatus in the first embodiment will be described below.

The reproduction apparatus 100a includes a video image decoding unit 110 and a video image output unit 111 in addition to the constructions of the reproduction apparatus shown in FIG. 1. The video image decoding unit 110 is a circuit that decodes video image data encoded using a specific encoding system and is constructed from hardware. The video image output unit 111 displays video images on a display apparatus in accordance with the video image data decoded by the video image decoding unit 110.

Also, in this embodiment, encoded video images and audio data are multiplexed and stored on the memory card 107 in accordance with a specific file format. File formats that are currently widely used include ASF (Advanced Streaming Format), MP4, and the like that support multiple video image/audio data encoding systems.

In this embodiment, video image data decoding processing is performed by the video image decoding unit 110 constructed from hardware, so it is possible to reproduce only video image data encoded using a specific encoding system.

On the other hand, audio data is decoded by software, so it is possible to reproduce audio data encoded using multiple encoding systems. In order to reproduce audio data, it is required to load a decoding program corresponding to the encoding system of the audio into the audio decoding program storing memory 104a.

The reproduction apparatus 100a in this embodiment is capable of reproducing audio data encoded using four kinds of encoding systems. To do so, four kinds of decoding programs corresponding to the four kinds of encoding systems are stored in the flash ROM 103 (see FIG. 6).

Figure 11:
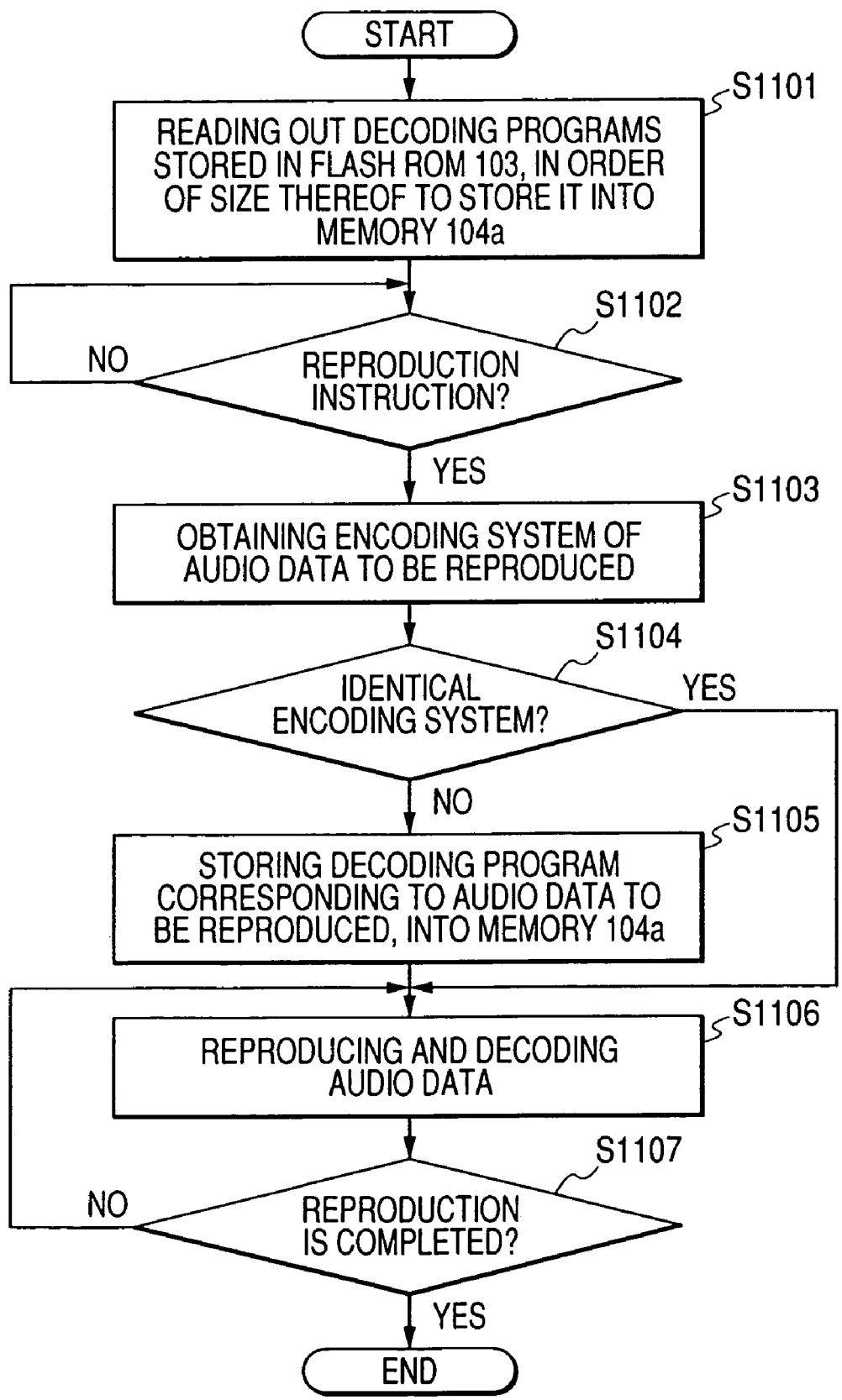
FIG. 11 is a flowchart showing reproduction processing in the second embodiment.

FIG. 11 is a flowchart showing reproduction processing in this embodiment.

At the time of power-up or in response to attaching of the memory card 107 to the reproduction apparatus 100a, the flow in FIG. 11 is started. The CPU 101 reads out decoding programs stored in the flash ROM 103 in order of program data size (data amount) thereof to store them into the audio decoding program storing memory 104a. Following this, when storing the decoding program into the memory 104a becomes impossible, the reading out from the flash ROM 103 is stopped (Step S1101).

Figure 6:
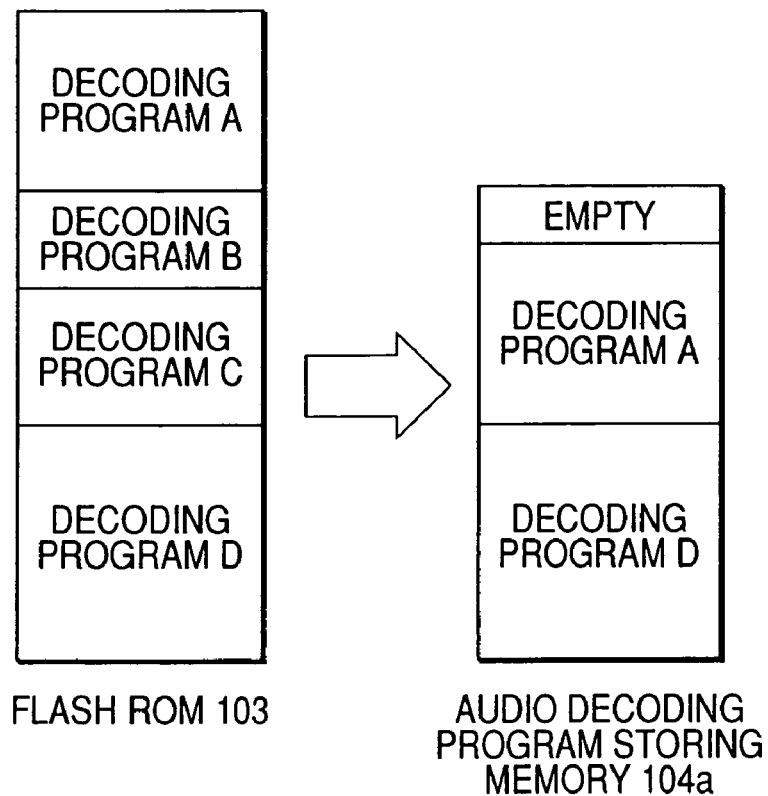
FIG. 6 shows a decoding program loadment method in the second embodiment.

In the example shown in FIG. 6, a decoding program A and a decoding program D are stored into the audio decoding program storing memory 104a.

Following this, when a user instructs to start reproduction by operating the operation unit, 108 (Step S1102), it is judged whether the encoding system of data to be reproduced is the same as any of the encoding systems corresponding to the decoding programs stored in the audio decoding program storing memory 104a (Step S1104).

When the encoding system of the audio data to be reproduced is different from all of the encoding systems corresponding to the decoding programs stored in the memory 104a, the CPU 101 reads out a decoding program corresponding to the encoding system of the audio data to be reproduced from the flash ROM 103 and stores it into the audio decoding program storing memory 104a (Step S1105). Then, the audio data is reproduced from the memory card 107 and is decoded using the decoding program stored in the memory 104a (Step S1106). The decoded audio data is outputted to a speaker, a headphone, or the like outside the apparatus through the audio output unit 102.

On the other hand, when the encoding system of the audio data to be reproduced is the same as any of the encoding systems corresponding to the decoding programs stored in the memory 104a, the CPU 101 readily reproduces the audio data to be reproduced from the memory card 107 and decodes the reproduced audio data using one of the decoding programs stored in the memory 104a.

Following this, when it is instructed to stop the reproduction or the audio data to be reproduced has been reproduced to the end thereof, the processing is ended (Step S1107).

As described above, when a decoding program corresponding to the encoding system of audio data to be reproduced is not stored in the audio decoding program storing memory 104a, it is read from the flash ROM 103 and is loaded into the audio decoding program storing memory 104a. However, decoding programs having large sizes are loaded in advance, so it becomes possible to shorten a decoding program load time.

As a result, it becomes possible to shorten a time lag between issuance of a reproduction start instruction and start of reproduction.

Next, a third embodiment will be described. A reproduction apparatus in this embodiment has basically the same construction as in the second embodiment, that is, the construction shown in FIG. 5.

Figure 12:
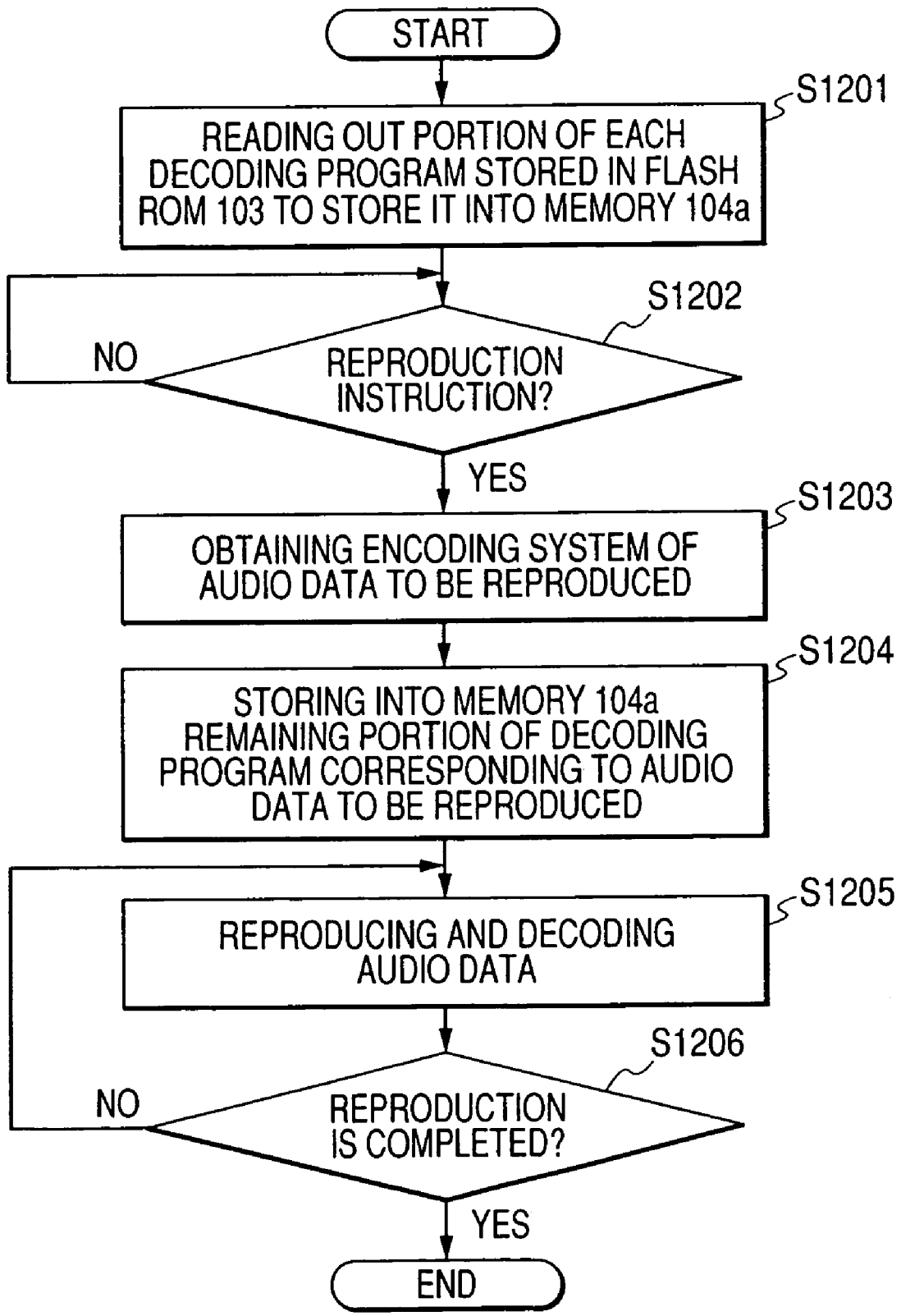
FIG. 12 is a flowchart showing reproduction processing in the third embodiment.

FIG. 12 is a flowchart showing reproduction processing in this embodiment and only each step that is different from the steps in the second embodiment will be described in the following explanation.

Figure 7:
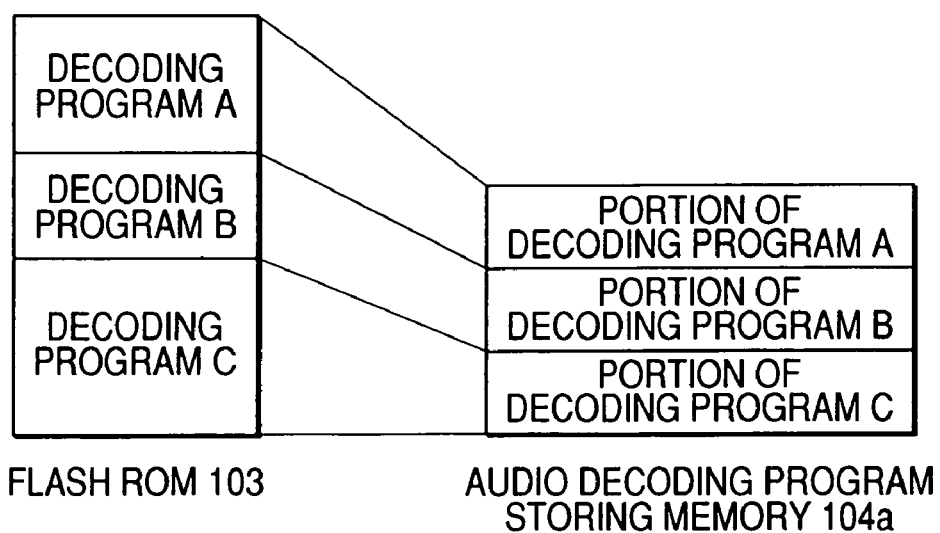
FIG. 7 shows a decoding program loadment method in the third embodiment.

In this embodiment, in response to power-up or attaching of the memory card 107, a portion of each of multiple kinds of decoding programs stored in the flash ROM 103 is read out and is stored into the audio decoding program storing memory 104a (Step S1201). A state of this operation is shown in FIG. 7. In FIG. 7, a portion of each of decoding programs A to C is read out from the flash ROM 103 and is stored into the memory 104a.

Following this, a reproduction instruction is waited for (Step S1202). When reproduction is instructed, the encoding system of audio data to be reproduced is detected (Step S1203). Then, a portion of a decoding program corresponding to the encoding system of the audio data to be reproduced other than the portion thereof already stored in the memory 104a in Step S1201 is read out from the flash ROM 103 and is stored into the memory 104a (Step S1204). When doing so, when no available space exists in the memory 104a, overwriting into a recording area assigned to a program other than the target decoding program is performed.

Then, the target audio data is reproduced from the memory card 107 and is decoded using the decoding program stored in the memory 104a (Step S1205). Following this, until the reproduction is completed, the processing is continued (Step S1206).

As described above, in this embodiment, a portion of each of multiple kinds of decoding programs is stored into the decoding program storing memory 104a in advance prior to start of reproduction of audio data, so it becomes possible to shorten a time lag between issuance of a reproduction start instruction and loadment of a decoding program in the memory. As a result, it becomes possible to start decoding of audio data swiftly.

Figure 8:
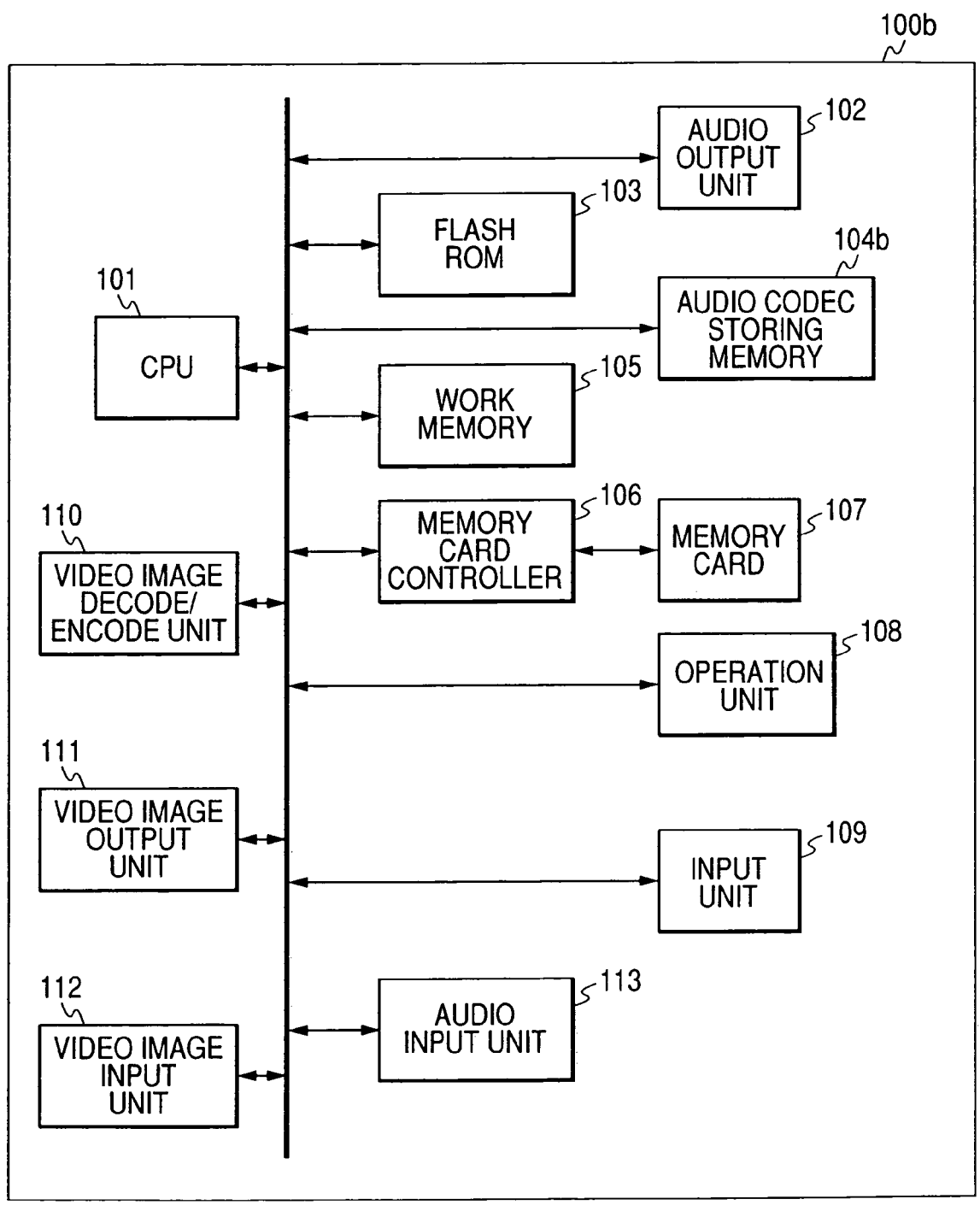
FIG. 8 is a construction diagram of a recording and reproduction apparatus in a fourth embodiment.

Next, a fourth embodiment will be described. FIG. 8 shows a construction of a recording and reproduction apparatus 100b to which the present invention is applied. Each construction that is the same as a construction shown in FIGS. 1 and 5 will be described using the same reference numeral. The recording and reproduction apparatus in this embodiment has a function of recording moving images and audio data in addition to the functions of the reproduction apparatuses shown in FIGS. 1 and 5.

That is, the recording and reproduction apparatus 100b includes a video image decode/encode unit 110, a video image input unit 112, and an audio input unit 113 in addition to the constructions shown in FIG. 5. Also, in this embodiment, at the time of recording of audio data inputted from the audio input unit 113, the CPU 101 encodes the audio data using an audio encoding program and records a result of the encoding in the memory card 107. At the time of the recording, encoding is performed in accordance with only one kind of encoding system. Also, at the time of reproduction of the audio data, the CPU 101 performs decoding using an audio decoding program. Therefore, in the flash ROM 103, an audio codec, which includes an audio encoding program used at the time of the recording and an audio decoding program corresponding to the encoding system used at the time of the recording, and decoding programs corresponding to various kinds of audio encoding systems are stored. With this construction, at the time of recording or reproduction of audio data, the audio codec or audio decoding program stored in the flash ROM 103 is read out and is stored into an audio codec storing memory 104b.

On the other hand, the video image decode/encode unit 110 is a circuit that performs video image data encoding and decoding processing and is constructed from hardware. The video image input unit 112 and the audio input unit 113 take in video images and audio respectively at the time of moving image recording. At the time of the moving image recording, the video image data taken in by the video image input unit 112 is encoded by the video image decode/encode unit 110 and the audio data taken in by the audio input unit 113 is encoded by the CPU 101.

An encoding program necessary to encode audio data is read from the flash ROM 103 in advance prior to start of recording and is stored into the audio codec storing memory 104b. In this embodiment, at the time of the recording, both of the video image data and the audio data are encoded in accordance with one kind of encoding system. The encoded video image data and audio data are multiplexed by the CPU 101 in accordance with a predetermined file format and are recorded onto the memory card 107 by the memory card controller 106.

Figure 13:
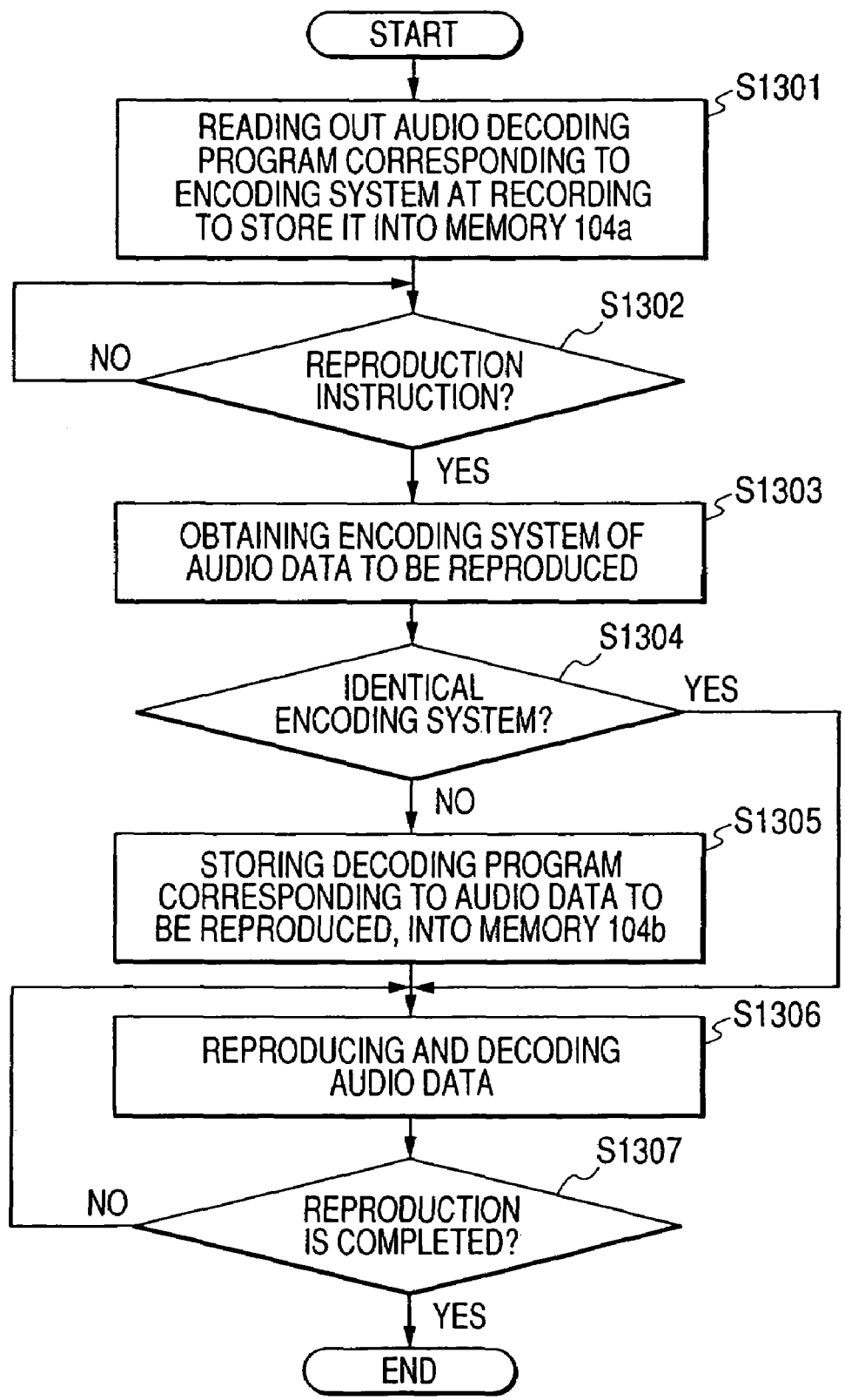
FIG. 13 is a flowchart showing reproduction processing in the fourth embodiment.

Next, processing at the time of reproduction will be described. FIG. 13 is a flowchart showing a reproduction operation in this embodiment.

When a mode switch of the operation unit 108 is operated and a reproduction mode is set, the CPU 101 reads out an audio codec from the flash ROM 103 prior to issuance of a reproduction instruction and stores it into the audio codec storing memory 104b.

When doing so, the CPU 101 selects a decoding program for decoding data in an audio encoding system used at the time of recording, from among the audio decoding programs stored in the flash ROM 103, reads out the selected decoding program, and stores the read-out decoding program into the memory 104b (Step S1301).

Following this, when a user instructs to start reproduction by operating the operation unit 108 (Step S1302), it is judged whether the encoding system of the audio data to be reproduced is the same as the encoding system corresponding to the decoding program stored in the audio codec storing memory 104b (Step S1304).

When the encoding system of the audio data to be reproduced is different from the encoding system corresponding to the decoding program stored in the memory 104b, the CPU 101 reads a decoding program corresponding to the encoding system of the audio data to be reproduced from the flash ROM 103 and stores it into the audio codec storing memory 104b (Step S1305). Then, the audio data is reproduced from the memory card 107 and is decoded using the decoding program stored in the memory 104b (Step S1306).

On the other hand, when the encoding system of the audio data to be reproduced is the same as the encoding system corresponding to the decoding program stored in the memory 104b, the CPU 101 readily reproduces the audio data to be reproduced from the memory card 107 and decodes the reproduced audio data using the decoding program stored in the memory 104b.

Following this, when it is instructed to stop the reproduction or the audio data to be reproduced has been reproduced to the end thereof, the processing is ended (Step S1307).

It is considered that audio data recorded on the memory card is reproduced using the recording and reproduction apparatus 100b in this embodiment in many cases. Therefore, in this embodiment, a decoding program corresponding to an encoding system used at the time of recording is read out from the flash ROM 103 and is stored into the memory 104b in advance prior to start of reproduction, which makes it possible to decrease a probability that it will be required to read out a decoding program from the flash ROM after it is instructed to start the reproduction.

Figure 14:
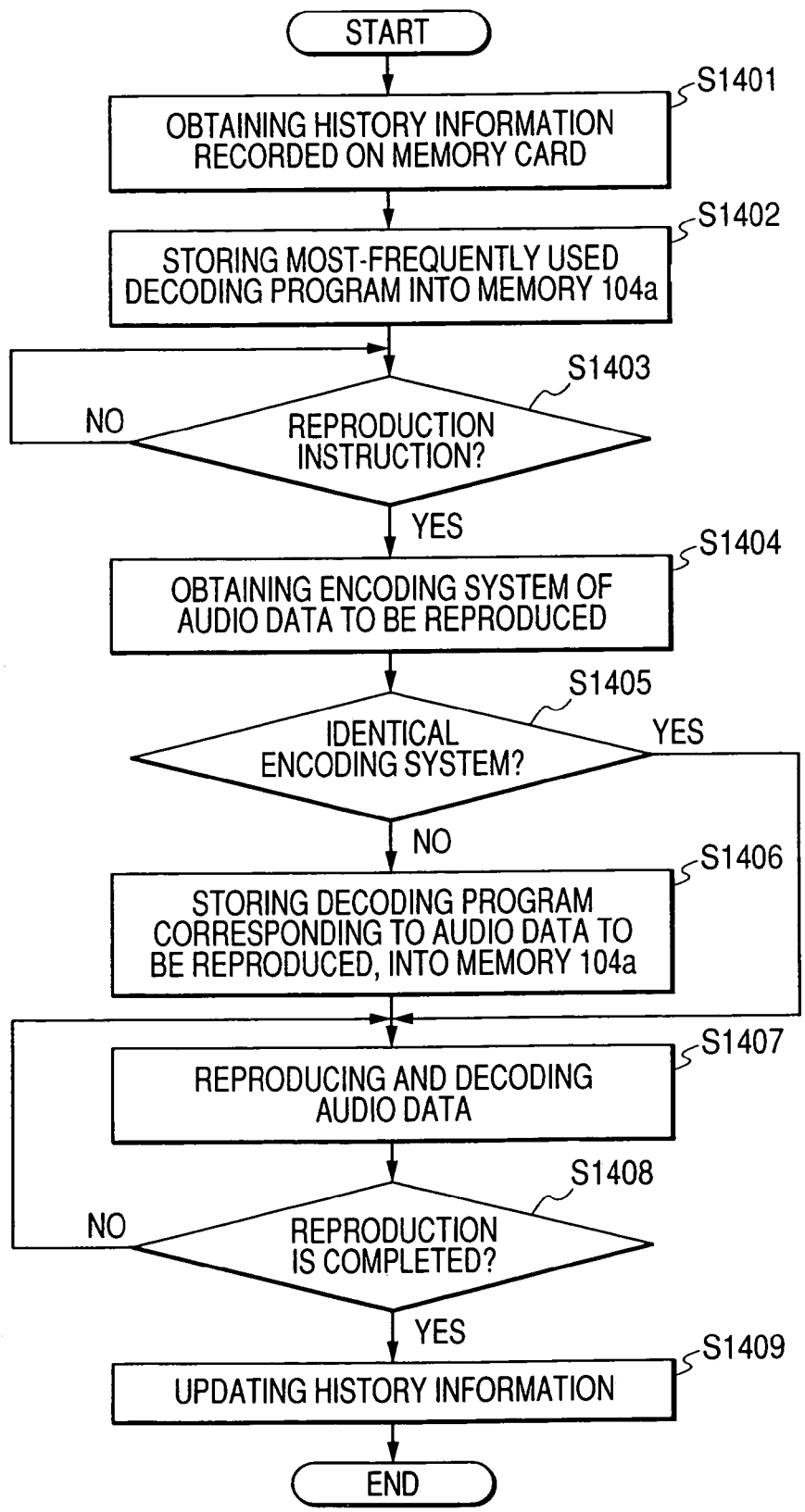
FIG. 14 is a flowchart showing reproduction processing in the fifth embodiment.

Next, a fifth embodiment will be described. A construction of a reproduction apparatus in this embodiment is the same as that shown in FIG. 5. Hereinafter, reproduction processing in this embodiment will be described. FIG. 14 is a flowchart showing the reproduction processing in this embodiment.

In this embodiment, the CPU 101 records the kinds of audio decoding programs used at a predetermined number of previous audio data reproduction, on the memory card 107 as history information.

Figure 9:
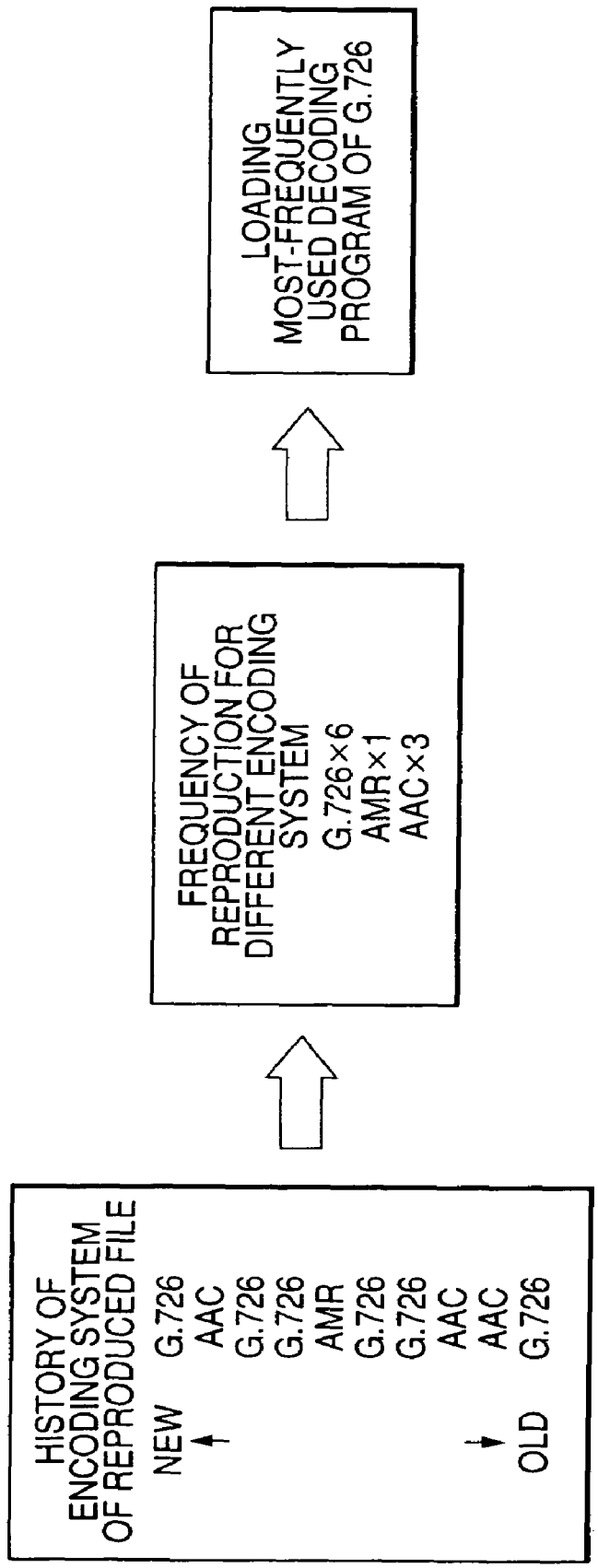
FIG. 9 shows a decoding program loadment method in the fifth embodiment.

Then, in response to power-up or attaching of a new memory card 107, the CPU 101 reads out the history information recorded on the memory card 107 through the memory card controller 105 (Step S1401), reads out the most frequently used audio decoding program from the flash ROM 103, and stores it into the audio decoding program storing memory 104a (Step S1402). A concrete example is shown in FIG. 9.

Following this, when a user instructs to start reproduction by operating the operation unit 108 (Step S1403), it is judged whether the encoding system of audio data to be reproduced is the same as the encoding system corresponding to the decoding program stored in the audio decoding program storing memory 104a (Step S1405).

When the encoding system of the audio data to be reproduced is different from the encoding system corresponding to the decoding program stored in the memory 104a, the CPU 101 reads a decoding program corresponding to the encoding system of the audio data to be reproduced from the flash ROM 103 and stores it into the audio decoding program storing memory 104a (Step S1406). Then, the audio data is reproduced from the memory card 107 and is decoded using the decoding program stored in the memory 104a in Step S1406 (Step S1407). The decoded audio data is outputted to a speaker, a headphone, or the like outside the apparatus through the audio output unit 102.

On the other hand, when the encoding system of the audio data to be reproduced is the same as the encoding system corresponding to the decoding program stored in the memory 104a, the CPU 101 readily reproduces the audio data to be reproduced from the memory card 107 and decodes the reproduced audio data using the decoding program stored in the memory 104a.

Following this, when it is instructed to stop the reproduction or the audio data to be reproduced has been reproduced to the end thereof, the processing is ended (Step S1408). Then, the history information is updated based on information about the decoding program used this time and the updated history information is recorded in the memory card 107 (Step S1409).

As described above, in this embodiment, the most frequently used decoding program is read out in advance based on history information showing decoding programs used at the time of previous reproduction of audio data recorded in the memory card, so it becomes possible to decrease a probability that it will be required to read out a decoding program from the flash ROM after it is instructed to start reproduction.

It should be noted here that in this embodiment, although the history information is recorded in the memory card 107, it is not necessarily required to record the history information in the memory card and a storage means in the apparatus may be used instead.

Also, in each embodiment described above, although an apparatus that records and/or reproduces video images and/or audio data on and/or from a memory card has been described, the present invention is not limited to this and is also applicable to an apparatus that records and/or reproduces data on and/or from another recording medium such as an optical disk.

Further, although each embodiment described above relates to decoding of audio data, the present invention is also applicable to decoding of moving image data, still image data, or the like in a like manner.

The object of the present invention can also be achieved by providing a storage medium storing program codes for performing the aforesaid processes to an image sensing system or apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart of FIGS. 10 to 14 described in the embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-188249 filed Jun. 25, 2004, which is hereby incorporated by reference herein.

What is claimed is:

1. A reproduction apparatus comprising:
reproduction means for reproducing a plurality of information data encoded using mutually different encoding systems from a recording medium;
program storage means for storing a plurality of kinds of decoding programs corresponding to the different encoding systems;
a program loading memory into which a part of the plurality of kinds of decoding programs can be loaded;
decode means for decoding information data reproduced by said reproduction means using a decoding program loaded into said program loading memory;
instruction means for instructing start of reproduction of the information data; and
control means for, before reproduction start is instructed by said instruction means, selecting a decoding program corresponding to an encoding system most frequently used to encode the plurality of information data recorded on the recording medium from among the plurality of kinds of decoding programs stored in said program storage means, reading out the selected decoding program from said program storage means, and loading the read-out decoding program into said program loading memory.

2. A reproduction apparatus according to claim 1, wherein in response to power-up, said control means selects a decoding program to be loaded into said program loading memory, reads out the selected decoding program from said program storage means, and loads the read-out decoding program into said program loading memory.

3. A reproduction apparatus according to claim 1, wherein in response to attaching of a new recording medium, said control means selects a decoding program to be loaded into said program loading memory, reads out the selected decoding program from said program storage means, and loads the read-out decoding program into said program loading memory.

4. A reproduction apparatus according to claim 1, wherein said control means detects an encoding system of infonnation data, the reproduction of which is instructed to be started by said instruction means,
wherein when a decoding program corresponding to the encoding system of the information data, the reproduction of which is instructed to be started, is different from the decoding program loaded into said program loading memory before start of the reproduction is instructed, said control means reads out the decoding program corresponding to the encoding system of the information data, the reproduction of which is instructed to be started, from said program storage means and loads the read-out decoding program into said program loading memory.

5. A reproduction apparatus according to claim 1, further comprising display means for displaying a list of the plurality of information data recorded on the recording medium in an order corresponding to the encoding system, wherein said instruction means selects a desired information data to be reproduced from the plurality of information data displayed in the list and instructs start of reproduction of the selected information data.

6. A reproduction apparatus comprising:
reproduction means for reproducing a plurality of information data encoded using mutually different encoding systems from a recording medium;
program storage means for storing a plurality of kinds of decoding programs corresponding to the different encoding systems;
a program loading memory into which a part of the plurality of kinds of decoding programs can be loaded;
decode means for decoding information data reproduced by said reproduction means using a decoding program loaded into said program loading memory;
instruction means for instructing start of reproduction of the information data;
detecting means for detecting decoding programs used at a time of previous reproduction of the plurality of information data recorded on the recording medium; and
control means for, before reproduction start is instructed by said instruction means, selecting a most frequently used decoding program from among the plurality of kinds of decoding programs stored in said program storage means based on a detection result of said detecting means, reading out the selected decoding program from said program storage means, and loading the read-out decoding program into said program loading memory.

7. A reproduction apparatus according to claim 6, wherein in response to power-up, said control means selects a decoding program to be loaded into said program loading memory, reads out the selected decoding program from said program storage means, and loads the read-out decoding program into said program loading memory.

8. A reproduction apparatus according to claim 6, wherein in response to attaching of a new recording medium, said control means selects a decoding program to be loaded into said program loading memory, reads out the selected decoding program from said program storage means, and loads the read-out decoding program into said program loading memory.

9. A reproduction apparatus according to claim 6, wherein said control means detects an encoding system of information data, the reproduction of which is instructed to be started by said instruction means,
wherein when a decoding program corresponding to the encoding system of the information data, the reproduction of which is instructed to be started, is different from the decoding program loaded into said program loading memory before start of the reproduction is instructed, said control means reads out the decoding program corresponding to the encoding system of the information data, the reproduction of which is instructed to be started, from said program storage means and loads the read-out decoding program into said program loading memory.

10. A reproduction apparatus comprising:

reproduction means for reproducing a plurality of information data encoded using mutually different encoding systems and recorded on a recording medium;

program storage means for storing a plurality of kinds of decoding programs corresponding to the different encoding systems;

a program loading memory into which a part of the plurality of kinds of decoding programs can be loaded;

decode means for decoding information data reproduced by said reproduction means, using a decoding program loaded into said program loading memory;

instruction means for instructing start of reproduction of the information data; and control means for, before reproduction start is instructed by said instruction means, reading out a portion of each of the plurality of kinds of decoding programs stored in said program storage means and loading the read-out portion into said program loading memory.

11. A reproduction apparatus according to claim 10, wherein when start of reproduction is instructed by said instruction means, said control means detects an encoding system of information data, the reproduction of which is instructed to be started, reads out from said program storage means a portion of a decoding program corresponding to the encoding system of the information data, the reproduction of which is instructed to be started, other than the portion thereof loaded into said program loading memory before start of the reproduction is instructed, and loads the portion read out from said program storage means into said program loading memory.

* * * * *

UNITED STATES PATENT AND TRADEMARK OFFICE
CERTIFICATE OF CORRECTION

PATENT NO. : 7,423,559 B2
APPLICATION NO. : 11/435864
DATED : September 9, 2008
INVENTOR(S) : Shuhei Kawachi It is certified that error appears in the above-identified patent and that said Letters Patent is hereby corrected as shown below:

ON COVER PAGE AT (57) ABSTRACT

Line 17, "starts" should read --start--.

SHEET 2

FIG. 2, "SYSTEM" should read --SYSTEMS--.

SHEET 4

FIG. 5, "INTPUT" should read --INPUT--.

SHEET 7

FIG. 9, "SYSTEM" should read --SYSTEMS--.

COLUMN 2

Line 1, "expect" should read --except--.

COLUMN 5

Line 52, "a waiting" should read --waiting--.

COLUMN 6

Line 56, "unit, 108" should read --unit 108--.

COLUMN 7

Line 63, "start of" should read --the start of--.

UNITED STATES PATENT AND TRADEMARK OFFICE
CERTIFICATE OF CORRECTION

PATENT NO. : 7,423,559 B2
APPLICATION NO. : 11/435864
DATED : September 9, 2008
INVENTOR(S) : Shuhei Kawachi It is certified that error appears in the above-identified patent and that said Letters Patent is hereby corrected as shown below:

<u>COLUMN 8</u>

Line 42, "start" should read --the start--.

Signed and Sealed this

Twelfth Day of May, 2009

JOHN DOLL
*Acting Director of the United States Patent and Trademark Office*